Sept. 27, 1949.  A. E. HARRISON  2,482,769
HIGH-FREQUENCY APPARATUS
Filed Dec. 28, 1944  3 Sheets-Sheet 1

INVENTOR
ARTHUR E. HARRISON
BY
Paul B. Hunter
ATTORNEY

Sept. 27, 1949.  A. E. HARRISON  2,482,769
HIGH-FREQUENCY APPARATUS
Filed Dec. 28, 1944  3 Sheets-Sheet 2
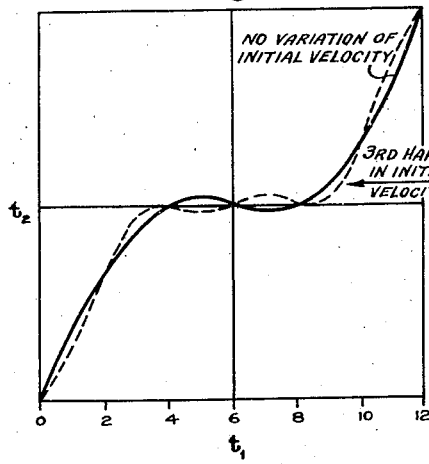
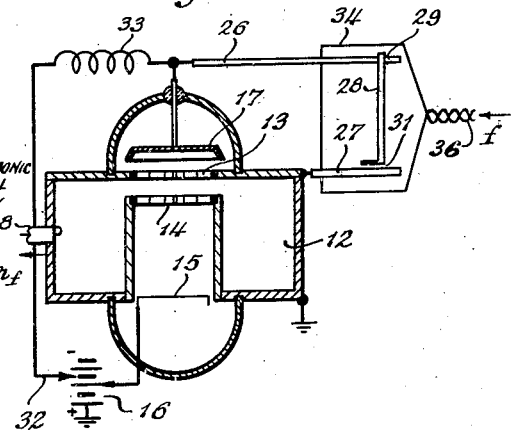
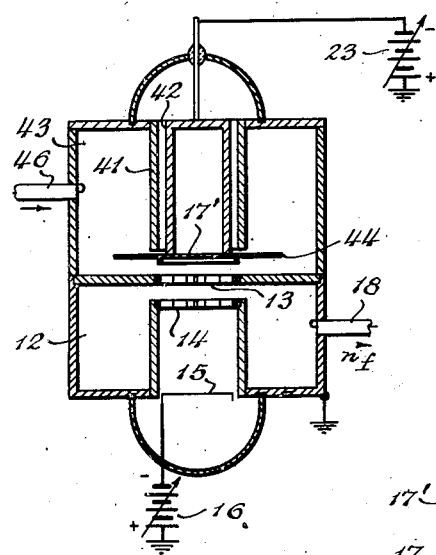
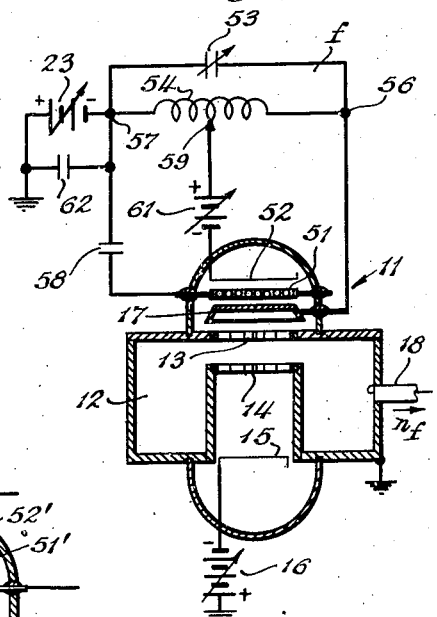
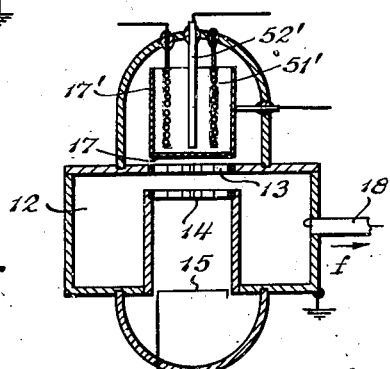
INVENTOR,
ARTHUR E. HARRISON
BY
Paul B. Hunter
ATTORNEY Sept. 27, 1949.  A. E. HARRISON  2,482,769
HIGH-FREQUENCY APPARATUS
Filed Dec. 28, 1944  3 Sheets-Sheet 3
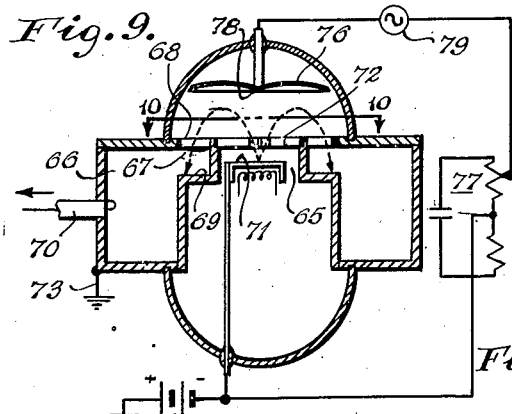
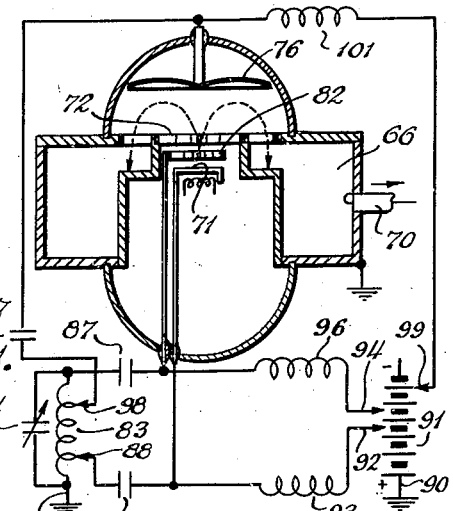
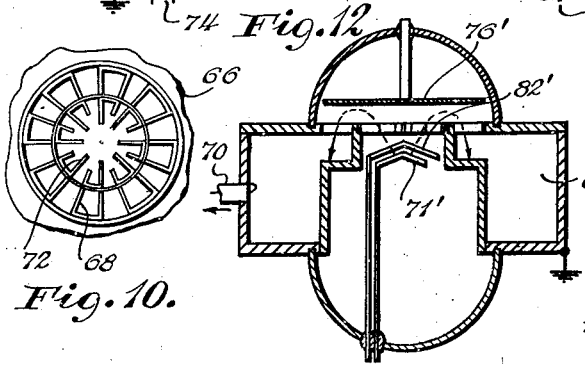
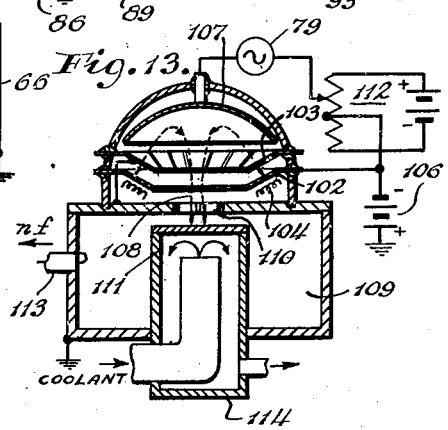
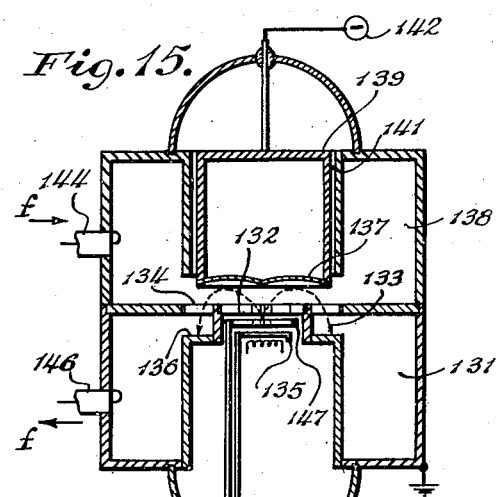
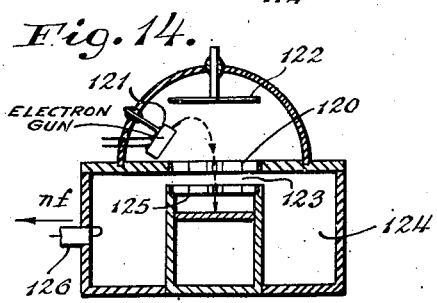
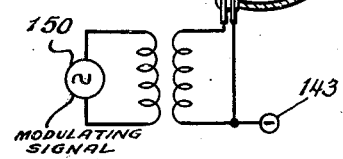
INVENTOR
ARTHUR E. HARRISON
BY
Paul B. Hunter
ATTORNEY Patented Sept. 27, 1949

2,482,769

UNITED STATES PATENT OFFICE 2,482,769

HIGH-FREQUENCY APPARATUS

Arthur E. Harrison, Rockville Centre, N. Y., assignor to The Sperry Corporation, a corporation of Delaware Application December 28, 1944, Serial No. 570,134

13 Claims. (Cl. 315—5)

The present invention is directed to ultra high frequency apparatus, especially of the cavity resonator type, and is more particularly concerned with methods of operating, and circuits for and structure of, electron-discharge devices using reflex action or electron-reflection, and operating as frequency multipliers, amplifiers, modulators, etc.

Prior art devices of the reflex type are well known, as illustrated by Fig. 2 of U. S. Patent No. 2,250,511. In such devices an electron beam is projected through a cavity resonator to be velocity modulated thereby, and is thereafter reflected and returned into the resonator in a grouped condition to sustain oscillations in the resonator. Such devices therefore operate on the velocity modulation principle as oscillation generators.

In the present invention, no reliance is placed on velocity modulation, but a new principle, which may be termed "transit-time modulation," is used instead. By the term "transit-time modulation" is meant the periodic variation of the transit time of the electrons of the stream between two points, at a predetermined transit-time-modulating frequency, whereby these electrons may become grouped at the second point into periodically recurring groups or bunches providing an electron current having alternating components of the modulating frequency and harmonics thereof. For this purpose the electron discharge tubes of the prior art may be utilized directly, with special circuit arrangements; or, alternatively, improved electron-discharge devices especially adaptable for transit-time modulation may be utilized in accordance with the principles of the present invention.

By the use of this novel principle of transit-time modulation, the present invention permits utilization of devices of the reflex type for the first time as frequency multipliers or amplifiers. This is possible by operation in an entirely different manner, not relying on velocity modulation as in the prior devices. According to the present invention, an electron stream is reflected into a cavity resonator or other high frequency energy-extracting device. The transit time of the stream is varied at a predetermined frequency, which produces electron grouping of the stream as it enters the resonator. These grouped electrons may deliver energy to the resonator at the predetermined frequency, producing amplifier action, or at a frequency harmonically related to the predetermined frequency, producing frequency multiplication.

As a feature of the invention, the transit-time modulation is produced by superposing a field of the predetermined frequency upon the retarding or reflecting field needed to reverse the flight of the electrons of the stream.

Accordingly, it is an object of the present invention to provide improved methods for and structure of electron discharge devices and apparatus operating on the principle of transit-time modulation.

It is a further object of the present invention to provide improved electron discharge apparatus of the reflex type and circuits and methods therefor useful in performing frequency multiplication, amplification, modulation, etc.

It is a still further object of the present invention to provide improved reflex electron discharge devices and circuits and methods for producing frequency multiplication or amplification by transit-time modulation.

A further object of the invention is to provide improved apparatus and methods embodying novel features and principles adapted for use in realizing the above objects and also in other fields.

The invention in another of its aspects relates to novel features of the apparatus described herein for achieving the above and other objects of the invention and to novel principles and methods employed in this apparatus, as used according to the above-mentioned objects or in other fields.

Further objects and advantages will be apparent from the following specification and drawings, wherein Fig. 1 is a schematic circuit diagram of one embodiment of the present invention using a conventional electron-discharge device and operating as a frequency multiplier;

Figs. 2, 3 and 4 are graphs useful in explaining the principle of operation of the present invention;

Fig. 5 is a schematic circuit diagram of a modified form of the present invention;

Fig. 6 is a schematic circuit diagram of an improved electron discharge device and circuit therefor operating according to the present invention;

Fig. 7 is a schematic circuit diagram of an improved electron discharge device operating according to the present invention and adapted both to oscillate and to multiply frequency;

Fig. 8 is a schematic diagram of a modified form of electron discharge device useful with the circuit of Fig. 7 or in other circuit arrangements;

Fig. 9 is a schematic circuit diagram of another form of improved electron discharge device and circuit operating according to the present invention;

Fig. 10 is a detail plan view of a portion of the apparatus of Fig. 9 viewed along line 10—10 thereof;

Fig. 11 is a schematic circuit diagram of a modification of the apparatus of Fig. 9 and including a self-oscillating frequency multiplier circuit;

Fig. 12 is a schematic diagram of a modified form of electron discharge device useful with the circuit of Figs. 9 or 11;

Fig. 13 is a schematic circuit diagram of still another form of the present invention adapted for use at higher powers;

Fig. 14 is a schematic diagram of a further form of electron discharge device useful in practicing the present invention; and Fig. 15 is a schematic diagram of an improved electron discharge device embodying the principle of the present invention and adapted for amplification or modulation.

Figure 1:
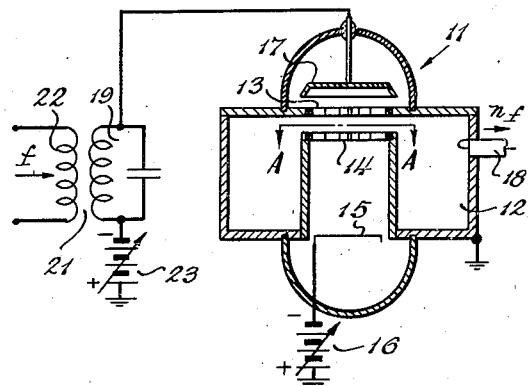
Fig. 1A is a detail plan view of the grid 14 taken along line A—A of Fig. 1.
Figure 1A:
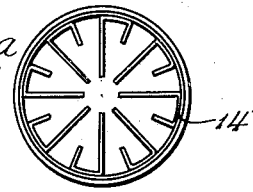
Figure 2:
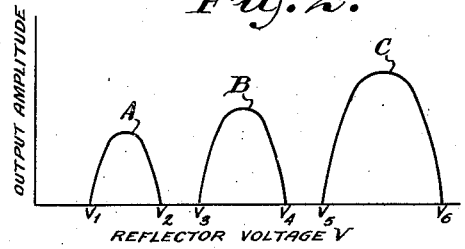

Referring to Fig. 1, there is shown schematically at 11 an electron discharge device of the type disclosed in Fig. 2 of Patent No. 2,250,511 which has been termed a reflex velocity-modulated electron discharge device. This device 11 includes a conducting cavity or hollow resonator 12 usually maintained at static ground potential and having a pair of electron-permeable grids or electrodes 13, 14 forming a narrow gap between their supporting resonator walls, in which gap the alternating electric field confined within the resonator is highly concentrated and extends across the gap between these grids. A cathode 15 is positioned to project an electron stream through the grids 14, 13 under the influence of an adjustable accelerating battery 16 having its negative terminal connected to cathode 15 and the positive terminal connected through ground to the resonator 12 and the entrance grid 14 thereof. On the opposite side of grids 13, 14 from cathode 15 is a reflector electrode 17 which, in the prior art, is usually maintained at a constant potential slightly negative or positive or equal to that of the cathode 15. With proper relation among (a) the accelerating voltage between cathode 15 and grid 14, (b) the resonant frequency of resonator 12, and (c) the potential applied to reflector electrode 17, ultra high frequency oscillations, substantially equal in frequency to the resonant frequency of resonator 12, may be generated in resonator 12, which oscillation might be supplied to any suitable output or load circuit by means of an output terminal 18, usually in the form of a coaxial transmission line terminating in a coupling loop within resonator 12.

In the prior art it has been customary to maintain the reflector voltage constant when using the device as an oscillation generator, since it is found that variation in this voltage changes the output frequency. When desired, the output could be modulated by superposing a modulating signal on the reflector voltage. However, the range of useful amplitudes of modulating signal is limited by the inherent characteristics of the device, as will be apparent from Fig. 2.

Fig. 2 illustrates a graph whose independent variable or abscissa is the reflector-to-ground voltage V and whose dependent variable or ordinate is the output amplitude or energy supplied to a load by terminal 18. The graph of Fig. 2 is plotted for a fixed resonator frequency and a fixed accelerating voltage supplied by battery 16. The curves A, B and C of Fig. 2 then represent the output amplitude of the reflex oscillator of the prior art as the reflector voltage is varied.

It will be seen that output is derived only for certain ranges of reflector voltage, such as $V_1$ to $V_2$, $V_3$ to $V_4$, $V_5$ to $V_6$, etc. In each of these regions maximum output is obtained only for a predetermined particular voltage or voltages differing only slightly therefrom.

According to the accepted theory of operation of such devices, the electron stream is velocity modulated on its first traverse of the gap between grids 13, 14 and its electrons are caused to vary periodically in velocity. The constant electric field between the exit grid 13 and the reflector electrode 17 retards these electrons. Electrons of differing velocities will have different transit times within this retarding field, those of higher velocity approaching reflector 17 more closely and hence having longer paths than those of lower velocity which are reflected more quickly and which have shorter paths. As a result of the velocity modulation, electrons passing through grids 14, 13 at differing instants of time will return to exit grid 13 substantially simultaneously in the form of a bunch or group of electrons. When such a bunch or group of electrons arrives back at grid 13 at the instant at which the electric field between grids 14, 13 is of a polarity opposing or retarding the flow of these electrons and of maximum amplitude, maximum energy will be delivered from the electrons to the field, and oscillations of the resonant frequency of resonator 12 will be sustained therein.

By changing the reflector voltage, the average transit time of the electrons in the retarding field is correspondingly varied. By this adjustment, the electron groups can be made to return to grid 13 after reflection in any desired phase relative to the resonator field. However, any substantial variation in reflector voltage will materially alter this given phase relation, and will materially decrease the amplitude of oscillation, or may stop oscillations entirely as when the adjusted reflector voltage is between $V_2$ and $V_3$, for example. Accordingly, if a modulating voltage is applied to the reflector electrode, the output may be varied. However, if the modulating voltage is of too great amplitude, the reflector voltage may be swung so far as to prevent oscillations completely. For this reason, the range of variation of the modulating voltage had to be kept relatively small in the prior art.

The above discussion of the prior art reflex oscillator is necessary to understand the principles of the present invention which, as will be shown, is not an oscillator but is a frequency multiplier or amplifier.

According to the present invention, when used as a frequency multiplier, the potential of reflector 17 is no longer kept constant, but is varied periodically at the frequency to be multiplied, which will be termed the fundamental frequency. Resonator 12 is then tuned to the desired harmonic of this fundamental frequency. In Fig. 1, there is shown one manner in which the reflector electrode 17 may thus have its potential varied at the fundamental frequency. In this case reflector electrode 17 is connected to the tuned secondary 19 of a transformer 21 to whose primary 22 is fed the fundamental frequency wave to which secondary 19 is tuned. The other terminal of secondary 19 is connected to the negative terminal of a suitable source of reflector voltage indicated schematically by battery 23, whose positive terminal is grounded. Batteries 23 and 16 may be formed by the same power supply and are preferably each adjustable as indicated.

By thus varying the reflector electrode at the fundamental frequency $f$, the electron stream is caused to be grouped at this frequency $f$. However, this grouping is not sinusoidal but contains a large percentage of harmonic frequency content. Accordingly, the retraverse of the grids 13, 14 by this fundamentally grouped stream will excite resonator 12 at the harmonic frequency to which this resonator is tuned, thus producing frequency multiplication.

The following is believed to be a true explanation of the principles of operation of the present invention.

Figure 3:
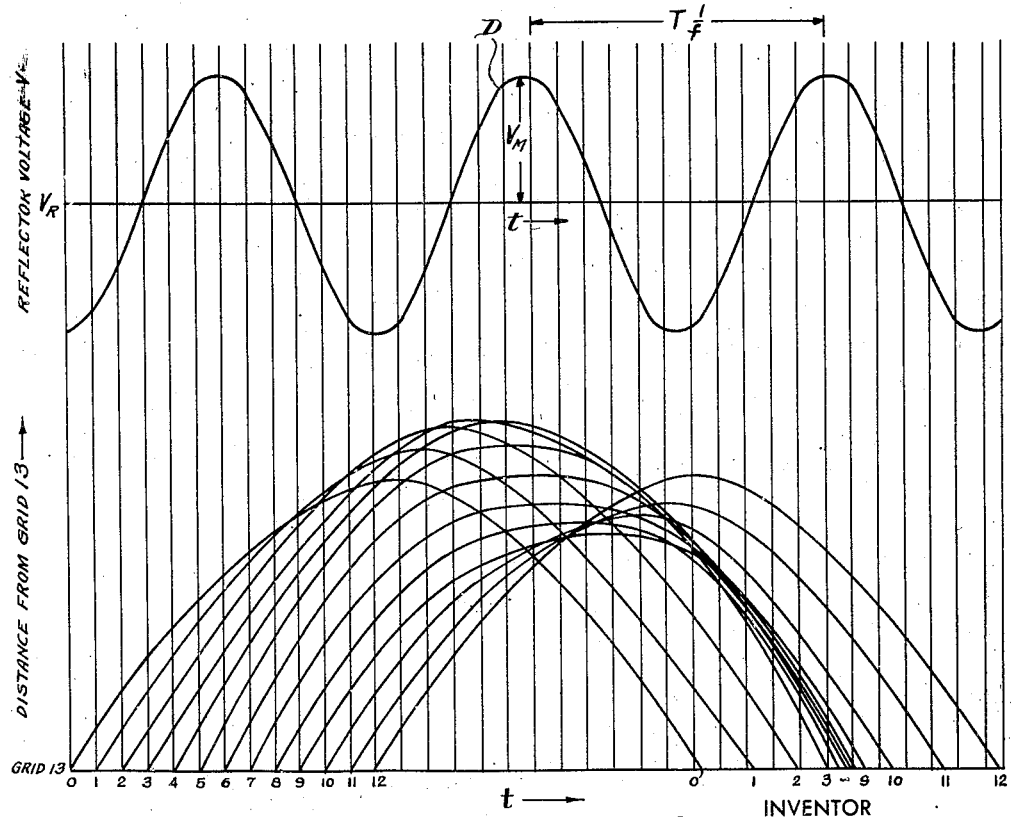

As a first approximation, let it be assumed that the electron stream passing exit grid 13 has uniform velocity; that is, all the successive electrons have the same velocity. Referring to Fig. 3, curve D represents the variation of instantaneous reflector voltage V as a function of time, just several cycles of this reflector voltage of frequency $f$ being indicated. $V_R$ is the average or unidirectional component of the negative reflector voltage with respect to ground, and $V_M$ is the amplitude of the alternating component of fundamental frequency $$f = \frac{\omega}{2\pi}$$

$V_M$ is therefore one-half the total swing in reflector voltage. The instantaneous reflector voltage can then be expressed as $V = V_R + V_M \cos \omega t$. The equation of motion of the electrons will then be given by $$\frac{d^2x}{dt^2} = -a - b \cos \omega t$$

where $x$ is the distance from the exit grid 13 measured toward the reflector 17, $a$ is a constant proportional to $$\frac{V_R}{s}$$

where $s$ is the exit-grid-to-reflector spacing, and $b$ is a constant proportional to $$\frac{V_M}{s}$$

The constant $a$ determines the average transit time of the electrons in the retarding field, and $b$ determines the degree of bunching.

By integration, this equation of motion becomes $$x = -\frac{a}{2}t^2 + tF_1(t_1) + F_2(t_1) + \frac{b}{\omega^2}\cos \omega t$$

where $t_1$ is the instant of time the electron under consideration enters the reflecting field through grid 13, and $F_1(t_1)$ and $F_2(t_1)$ are functions of $t_1$ given by $$F_1(t_1) = v_0 + at_1 + \frac{b}{\omega}\sin \omega t_1$$

$$F_2(t_1) = t_1 F_1(t_1) - \frac{b}{\omega^2}\cos \omega t_1 + \frac{a}{2}t_1^2$$

$v_0$ being the uniform and assumed constant entering velocity of the electron.

In Fig. 3 there is also plotted, against the same time scale, the paths of electrons entering the reflecting field at spaced intervals of $\frac{1}{12}$ the period $T$ of the fundamental frequency voltage. These curves are plotted with assumed values of $a$ and $b$ giving approximately two fundamental frequency periods as the average round-trip transit time. This value is illustrative only, since transit times as low as of the order of ½ cycle, or much larger than 2 cycles, may be used.

As shown in Fig. 3, electron No. 0 enters the reflecting field when it is most negative and is reversed quickly about one cycle later when the field is again most negative. Electron 3 enters the reflecting field when it has average value; thus this electron experiences a less negative retarding field during the first part of its travel and accordingly proceeds farther toward the reflector electrode. Also, it is not reversed so quickly, because the field is not so negative for it. Therefore it has a longer transit time than electron 0. Electron 6 entering the retarding field at its maximum positive value has an average retarding field during its initial travel and has about average transit time. Electron 9 entering the retarding field at its average value has a more negative retarding field during its initial travel, and has a short transit time. The in-between electrons behave similarly. In general, electrons 4 through 8 arrive almost instantaneously at the exit grid 13 after traversing the retarding field space, and are accordingly "bunched." Electron 6 forms the center of the bunch, the electrons leaving grid 13 just before it taking longer transit time, and those leaving grid 13 just after electron 6 taking less transit time, so that all these electrons arrive back at grid 13 almost together, as a bunch.

Since the bunching which thus takes place is solely due to difference in transit times, without any of the prior art velocity modulation, the electrons leaving grid 13 may be said to be "transit-time modulated" by the fundamental frequency voltage on reflector 17.

The solid-line curve of Fig. 4 shows the return time $t_2$ of the electrons at grid 13 after reflecting, as a function of the time $t_1$ they entered the reflecting field through grid 13. This figure shows how electrons 4 through 8 arrive almost together at about the same time $t_2$.

Fig. 4 also indicates generally the wave form of the electron current returning to grid 13, since the slope of the curve is the reciprocal of the electron current density. Where the slope is zero, as near positions 5 and 7, the current density is theoretically infinite, giving two infinite peaks of current density per fundamental cycle. This non-sinusoidal wave form for the current shows that it is rich in harmonics, so that, by tuning resonator 12 to a harmonic frequency, it will be excited to oscillate at that harmonic frequency. In practice, frequency multiplication ratios of 11 to 1 and 19 to 1 have been attained with ease.

An important advantage of the present invention is that, by making the average reflector voltage $V_R$ negative with respect to the cathode, no current flows to the reflector, and substantially zero fundamental frequency drive power is required. In this way, the drive equipment is made relatively simple and inexpensive.

The above analysis was made on the assumption that the entering velocity of all electrons was constant ($v_0$). Actually, since these electrons pass through resonator 12 before entering the reflecting space, they will be velocity modulated and will therefore have periodically varying velocities. However, the effect of this velocity modulation is slight and has little or no ultimate effect on the operation. The dotted curve of Fig. 4 shows how the situation is modified in a 3 to 1 multiplier. The third harmonic velocity modulation merely produces more infinite current density peaks, and, if anything, enriches the harmonic content of the beam, thereby improving operation.

The present invention can operate in two somewhat differing modes, either as a stabilized or "lock-in" oscillator, or as an actual driven frequency multiplier. In the first mode, as a lock-in oscillator, the average reflector voltage $V_R$ is adjusted so that it falls within one of the regions A, B, C, shown in Fig. 2, so that oscillations will be produced by ordinary reflex action at a frequency near to the desired frequency; this near frequency may be termed the "free-running frequency." The application of a fundamental frequency voltage of even relatively small amplitude to the reflector electrode then so varies the condition of oscillation of resonator 12 as to prevent stable oscillations except at the exact harmonic of the fundamental frequency, adjacent to the free-running frequency. The stronger the fundamental voltage, the stronger is the lock-in tendency. If the fundamental frequency is cut off, the oscillator will continue to oscillate at the near-by free-running frequency.

In the second mode of operation, any arbitrary average reflector voltage may be used, even one between $V_2$ and $V_3$, for example, in Fig. 2. The fundamental frequency voltage then produces the bunching described above, purely by transit-time modulation, and harmonic frequency output is derived only so long as the fundamental frequency is applied. This is true frequency multiplication action.

As discussed above, the average transit time of the electrons in the reflecting-field space is determined by the average potential $V_R$ of the reflector electrode. This potential is not critical, since optimum bunching for frequency multiplication can be obtained for a wide range of $V_R$ by adjusting the fundamental frequency voltage amplitude $V_M$. However, while adjusting $V_R$ over a range of values producing a change in average transit time of one period of the fundamental frequency voltage, it is found that for a part of this range of values a negative resistance effect occurs in the reflector field space; that is, there is a tendency for oscillations to be set up in this space by transfer of energy from the electron stream. For another portion of this range, a loading effect occurs; that is, there is an absorption of energy by the electron stream. The latter effect is undesirable, since it increases the power which the fundamental frequency source must supply. The negative resistance effect is advantageous, since it reduces the input power requirements. Under some circumstances, the input source could be dispensed with entirely, the fundamental frequency oscillations being set up entirely by this negative resistance effect.

In operation, therefore, the average electron transit time in the reflector field is adjusted to give a desirable amount of negative resistance effect. Then the amplitude of the input voltage of fundamental frequency is adjusted to give optimum bunching at the output resonator.

The present invention is not restricted to the specific circuit arrangement shown in Fig. 1, but many others may be utilized. Fig. 5 shows another circuit diagram of a modification of the invention, more adapted for use at high fundamental frequencies. This device differs from Fig. 1 merely in the manner in which the fundamental frequency voltage is applied to reflector electrode 17. In this instance, a parallel transmission line formed by conductors 26 and 27 is short-circuited at one end high-frequency-wise by an adjustable short-circuiting device 28 conductively connected to conductor 26 at point 29 and capacitively coupled to conductor 27 at 31. The other end of conductor 26 is connected to reflector electrode 17, while the other end of conductor 27 is connected to resonator 12, which is grounded. The unidirectional component of the reflector voltage is derived from a variable tap 32 on battery 16 and is connected to reflector 17 through a suitable radio frequency choke coil 33 which prevents reflector electrode 17 from being grounded in a high frequency sense through battery 16. Conductors 26 and 27 and the short-circuiting device 28 forms a short-circuited two-wire transmission line, which at resonance, as is known, is equivalent to a parallel resonant circuit. The resonant frequency of this circuit may be adjusted by adjusting the short-circuiting device 28 along the line, preferably to resonance at the fundamental frequency.

Inductively coupled to the line 26—27 is a single-turn loop of wire 34 which is connected to the source of fundamental frequency energy through any suitable high frequency conductor, illustrated as a twisted pair 36, but which may be in the form of a further two-wire transmission line or coaxial line. The operation of the device of Fig. 5 in frequency multiplication is the same as that of Fig. 1.

Fig. 6 shows a further embodiment of the invention having a greatly improved fundamental frequency input circuit and especially adapted for use with still higher fundamental frequencies approaching the ultra high frequency or microwave range. In this instance, the reflector electrode 17' is capacitively coupled to a tubular conductor 41 by means of a cylindrical extension 42 connected conductively to and supporting reflector 17'. Tubular member 41 forms the reentrant pole of a reentrant resonator 43 which is selected or adjusted to be resonant at the fundamental frequency. In order to reduce the physical size of resonator 43 for lower fundamental frequencies of this range, a conductive plate or flange 44 is carried by or formed as an integral extension of reflector electrode 17' parallel to the wall of resonator 12 carrying the exit grid 13. This flange 44, in cooperation with grid 13 and its supporting wall, provides capacity loading for resonator 43, permitting reduced size for the given fundamental frequency. Reflector electrode 17' is insulated in a direct current sense from resonator 43, which is grounded by direct conductive contact with resonator 12. If desired, an insulating spacer may be inserted between extension 42 and member 41. The extension 42 of reflector 17 is then connected to the negative terminal of adjustable reflector potential source 23 to supply the unidirectional component or average value of the reflector voltage. Fundamental frequency energy may be supplied to resonator 43 by any suitable input terminal such as 46. In this way resonator 43 is excited at the fundamental frequency and produces an alternating electric field component between reflector 17' and exit grid 13 of this fundamental frequency, superposed upon the constant reflecting field. Accordingly, the device of Fig. 6 will operate in exactly the same manner as the previous modifications described.

The device of Fig. 6 is especially advantageous when operating with the negative resistance characteristic discussed above. With the proper adjustment of the average reflector voltage provided by source 23, or the accelerating voltage provided by source 16 (or both), the fundamental frequency input supplied to line 46 may be omitted. Then fundamental frequency oscillations will be set up within resonator 43, which will produce transit-time modulation, and will also produce harmonic frequency energy in output resonator 12.

Fig. 7 shows a further embodiment of the invention in which the source of fundamental frequency energy is built into the frequency multiplier of the present invention. For this purpose reflector electrode 17 serves as the anode of a conventional vacuum tube section located within the same envelope as the reflex device 11. Thus, adjacent to reflector 17 on the side thereof opposite the resonator 12 is a control grid 51 having a second cathode 52 on its opposite side. Cathode 52, control grid 51, and electrode 17 serve as a conventional triode device. It will be understood that the present form of the invention is not restricted to a triode, but any type of known electron tube may be thus formed, such as pentodes, hexodes, heptodes, etc.

An oscillator circuit is connected to electrode 17, control grid 51, and cathode 52 in such manner as to cause electrode 17 to vary in potential with respect to the grounded exit grid 13 at the fundamental frequency. Fig. 7 illustrates a simple Hartley oscillator thus connected. In this figure, a tunable tank circuit is formed by adjustable condenser 53 and inductance 54. One terminal 56 of this tank circuit is connected directly to electrode 17. The other terminal 57 is connected to control grid 51 through a blocking condenser 58. A tap 59 of the inductance 54 is connected through an anode potential source 61 to the cathode 52, the negative terminal of source 61 being connected to cathode 52. In this way by proper tuning of the circuit 53, 54 and adjustment of tap 59, as is well known, oscillations of the fundamental frequency will be set up in this tank circuit and will cause the potential of electrode 17 to vary at this frequency with respect to point 57, which is connected in alternating current fashion to ground and grid 13 through by-pass condenser 62. Between point 57 and ground is also connected the reflector electrode potential source 23, having its positive terminal grounded and its negative terminal connected to point 57. In this way the average potential of electrode 17 will be provided by the voltage across battery 23, and the alternating fundamental frequency voltage across the tank circuit 53, 54 provides the alternating component of the reflector voltage. The remainder of the apparatus of Fig. 7 then operates in exactly the same manner as discussed above to produce frequency multiplication, since the potential of reflector electrode 17 is caused to vary at the fundamental frequency.

Fig. 8 shows a modification of the device of Fig. 7, in which supplementary cathode 52', control grid 51' and anode 17' are formed concentrically as cylindrical electrodes. The end face of cylindrical anode 17' serves as reflector 17. The device of Fig. 8 may be connected to an external circuit in the same manner as in Fig. 7.

In the above described embodiments of the present invention, those of Figs. 1 and 5 utilize the conventional reflex velocity modulation electron discharge devices which have come to be known by the trade-name Reflex Klystron. Figs. 6 to 8 illustrate special forms of electron discharge device, particularly useful in the present novel frequency multiplier apparatus. In all of these forms, however, some slight velocity modulation at the harmonic frequency will be encountered, since the electron stream traverses the output harmonic resonator twice. As discussed above relative to Fig. 4, such velocity modulation has relatively small effect, but may be useful where a lock-in type of frequency multiplier is desired which may operate in a free-running condition when the fundamental frequency input is cut off. However, such velocity modulation may, under some circumstances, be considered undesirable, and is not an essential part of the present invention in its broader aspects.

Figs 9 and 10 illustrate a form of the invention which eliminates this velocity modulation and relies solely upon the transit-time modulation principle discussed above. In this modification of the invention a specially formed resonator 66 is utilized, having an annular gap 67 surrounding a central axial opening 65. Gap 67 is defined by an annular grid 68 adjacent to an annular collecting surface 69 formed in the wall of the resonator. Located within the central opening 65 is a suitable electron-emissive cathode 71, illustrated as of the indirectly heated thermionic type. An accelerating grid 72 is positioned across the opening 65 and is connected to the resonator casing, which is grounded at 73. Grid 72 may be independent of resonator 66, if desired. Cathode 71 is maintained at a negative potential with respect to grid 72 by means of battery 74 having its negative terminal connected to cathode 71 and its positive terminal connected to grid 72 through ground. In this way cathode 71 and grid 72 form an electron gun which produces a uniform velocity cylindrical electron stream. Any other suitable form of electron gun may be utilized in place of these electrodes.

Located in the path of this electron stream is a reflector electrode 76, to which is applied a potential negative with respect to grid 72 and differing slightly from that of the cathode 71. This potential is applied by means of an adjustable voltage source 77 connected between cathode 71 and reflector electrode 76. The reflector electrode 76 is specially formed to reverse the flight of the incident cylindrical electron beam and to return these electrons in the form of an annular electron stream. For this purpose reflector 76 is formed with a central reentrant tip 78 which spreads the cylindrical electron stream incident thereon and converts it into the desired annular form. The reversed annular stream is then projected through annular grid 68 across gap 67, and is then collected by the collecting surface 69. If desired, the collecting surface 69 may also be formed as an electron-permeable grid, in which case a suitable electron collector will be disposed in the path of the stream beyond this grid. This latter arrangement may be desirable where secondary electrons formed by the electron stream impinging on surface 69 might be undesirable or harmful.

Also impressed on reflector electrode 76 is an alternating potential of fundamental frequency $f$ derived from a source schematically indicated at 79 and connected between the reflector 76 and cathode 71. Any suitable connection of source 79 to reflector 76 may be used. In this way, in accordance with the principles discussed above, the uniform velocity electron stream passing through grid 72 is transit-time-modulated at the fundamental frequency $f$ and is returned through the gap 67 of resonator 66 in a bunched condition, whereby it delivers ultra high frequency energy of the harmonic frequency to this resonator 66. This harmonic frequency energy may then be suitably extracted by an output terminal 70 for use as desired.

It will be seen that the apparatus of Figs. 9 and 10 operates purely on the transit-time modulation principle, since no velocity modulation occurs in the sense utilized in the prior art devices, the electron stream entering the reflecting field space being of uniform velocity.

Fig. 11 shows a modification of the device of Figs. 9 and 10 in which the tube structure is the same, with the addition of a control grid 82 positioned between cathode 71 and the grid-like accelerating anode 72. In Fig. 11 there is also shown an improved circuit arrangement in which cathode 71, grid 82 and grid-like anode 72 operate as a self-excited oscillator for producing fundamental frequency energy. The output of this oscillating circuit, as will be described hereinafter, is further frequency multiplied by the transit-time modulation principle of the present invention.

The oscillator tank circuit is formed by inductance 83 and variable capacitance 84 connected in parallel therewith. One terminal of this tank circuit 83, 84 is directly grounded at 86. The other terminal of the tank circuit 83, 84 is connected to grid 82 through a direct current blocking condenser 87. Cathode 71 is connected to an intermediate adjustable tap 88 of coil 83 through a further blocking condenser 89.

Grounded anode electrode 72 is connected to the positive terminal of an electron-accelerating voltage source 91 by virtue of its ground connection 90. Cathode 71 is maintained at a negative potential with respect to anode 72 by its connection to an adjustable tap 92 of battery 91 through a radio frequency choke coil 93. Control grid 82 is suitably biased with respect to cathode 71 by its connection to a further variable tap 94 of source 91 through another radio frequency choke coil 96. In this way cathode 71, control grid 82 and anode 72 are connected in a conventional oscillator circuit and produce oscillations in the tank circuit 83, 84 of the fundamental frequency $f$.

A suitable voltage of this fundamental frequency $f$ is then derived from an adjustable tap 98 on coil 83 and applied to the reflector electrode 76 through a blocking condenser 97. The average unidirectional potential of reflector 76 is derived from a further adjustable tap 99 of battery 91 through a radio frequency choke coil 101 which prevents short-circuiting of reflector electrode 76 to ground with respect to high frequencies.

In this way the electron stream emitted from cathode 71 first functions to create fundamental frequency oscillations. Thereafter it enters the reflecting field space and is transit-time modulated to multiply this fundamental frequency and produce harmonic frequency energy in the harmonic resonator 66 in the manner discussed above. This frequency-multiplying action is assisted to some extent by the fact that the electron stream entering the reflecting field space through grid 72 is varied in current intensity at the fundamental frequency by virtue of the alternating voltage of this fundamental frequency appearing between grid 82 and cathode 71, in the usual density modulation manner. By a proper choice of circuit constants and potentials, the phase of this current variation at fundamental frequency can be adjusted to cooperate with the transit-time modulation at the fundamental frequency to enhance the harmonic energy output from the device. The optimum condition is obtained when the electrons forming the center of the bunch produced by transit-time modulation are most numerous, and the electrons between the bunches are least numerous; that is, the bunch electrons should pass grid 82 when it is near its maximum potential and is most positive.

Fig. 12 illustrates a slightly different type of electron-discharge device useful in either of the circuits of Fig. 9 or 11. In Fig. 12 the reflector electrode 76' is planar, while the cathode structure 71' is arranged to have its emissive surface in the form of a very shallow cone, instead of being flat as in the prior figures. The resonator 66 is identical with that of Figs. 9 and 11. The modified form of cathode 71' and reflector 76' produces the same type of electron flow as in the prior Figs. 9 and 11, so that the device of Fig. 12 will operate in exactly the same manner as these figures. A control grid 82', also of shallow conical configuration, is interposed between cathode 71' and anode grid 72, as in Fig. 11.

Fig. 13 shows a further form of electron-discharge device adapted for performing the same functions as the prior embodiments of the invention. In this instance, an annular cathode 102 is disposed in a slightly dished configuration and has adjacent to it an accelerating electron-permeable grid-like anode 103 which is preferably maintained at ground potential. Cathode 102 may be heated by any suitable heater means indicated schematically at 104. A battery 106 maintains anode-grid 103 highly positive with respect to cathode 102 so that the combination of these elements forms an electron gun for providing a converging annular stream of electrons. This converging stream is reflected by a curved reflector electrode 107 to form a reflected cylindrical stream, as indicated by the dotted lines 108. This reflected stream then enters a resonator 109 by way of an entrance grid 110 disposed opposite to an anode 111 and providing a narrow gap therebetween in which the electric field of the resonator 109 is concentrated.

The average potential of the reflector electrode 107 relative to the cathode 102 may be adjusted by a variable biasing source 112. The potential of the reflector electrode 107 is also varied at the fundamental frequency $f$ by the source 79 connected therewith in any suitable manner. Resonator 109 is then tuned to a desired harmonic of this fundamental frequency, and harmonic frequency energy may be extracted by its output coupling 113 as in the preceding arrangements.

In view of the large surface area of cathode 102, the device of Fig. 13 is adapted to operate at substantially higher power than the preceding forms of the invention. Accordingly, suitable cooling means 114 may be provided for providing circulating coolant to the outer face of the collecting anode 111 for extracting therefrom the heat generated by electrons impinging thereon. If desired, electrode 111 could be made permeable to the electrons, in which case a separate collector anode would be provided. It will be understood that a control grid might be interposed between cathode 102 and accelerating electrode or anode 103. This control grid may be suitably biased as desired, or may be connected in self-oscillating circuits as in the preceding figures.

Other forms of electron discharge device suitable for use in the present invention will be evident. For example, it is not necessary to convert from a cylindrical stream to an annular stream by reflection as in Figs. 9 through 12, or to convert from an annular stream to a cylindrical stream as in Fig. 13. If desired, the electron gun may produce a cylindrical stream of electrons which, on reflection, retains its cylindrical form on entering the resonator, as shown in Fig. 14, wherein the electron gun 121 produces a cylindrical stream of electrons of constant velocity which is reflected by the planar reflector electrode 122 and then projected through the gap 123 of resonator 124 similar to resonator 109 of Fig. 13. The device of Fig. 14 illustrates a resonator gap and electron collector arrangement which may also be used in Fig. 13. Again, in Fig. 14, by varying the voltage of reflector 122 at the fundamental frequency, harmonic frequency energy to which resonator 124 is tuned may be extracted therefrom by its output line 126.

In each of the above arrangements the resonator may be made adjustably tunable and, when provided with a wide enough tuning range, may be tuned to several different harmonics of the fundamental frequency. In this way the same device may selectively produce energy of different harmonic frequencies of the fundamental frequency and may be used, for example, as the local oscillator in a multi-channel system having a fixed frequency separation between channels equal to the fundamental frequency.

In each of the above-described embodiments of the present invention transit-time modulation has been utilized for the production of frequency multiplication. However, the present invention contemplates a broader use for such transit-time modulation, and Fig. 15 illustrates an amplifier device operable in accordance with the principles of transit-time modulation. The device of this figure is provided with an output cavity resonator 131 which is substantially identical with the resonator of Fig. 9, 11 or 12, having a central accelerating electrode 132, an annular resonator gap 133 defined by annular grid 134, and an electron-intercepting or collecting surface 136, which may be replaced by a second annular grid, if desired. In such case, a separate electron collector is provided. Reflector electrode 137 has its lower surface shaped similar to reflector 76 to convert the cylindrical electron beam passing through grid 132 into a reflected annular beam passing across the resonator gap 133.

Electrode 137 cooperates with grids 132 and 134 to form the gap of the input resonator 138, at which gap the concentrated electric field of the resonator 138 appears. For this purpose reflector 137 is formed in the end of a cylindrical member 139 capacitively coupled at 141 to the grounded wall of resonator 138. Reflector electrode 137 is maintained at a suitable average potential negative with respect to ground by its connection to a source indicated schematically at 142. Similarly, cathode 135, located opposite the grounded accelerating grid 132, is maintained at a suitable negative potential with respect to ground by a source 143. The average potential of reflector electrode 137 may be slightly negative or positive with respect to that of cathode 135, and is preferably adjustable for optimum operation.

The high frequency wave to be amplified is supplied to the input resonator 138 by an input coupling 144. In this way the resonator 138 is excited to oscillation at the input frequency, to which it is substantially tuned, and an alternating high frequency field of this input frequency appears between reflector 137 and grids 132 and 134. This alternating field is superposed on the negative unidirectional retarding field provided by source 142 connected to reflector 137. The constant-velocity electron stream projected into the resonator 138 through grid 132 is therefore reflected and transit-time modulated by this field in resonator 138. The electron stream therefore becomes grouped or bunched and is therefore capable of yielding high frequency energy of the input frequency to the field of output resonator 131 at the gap 133, the output resonator 131 being also substantially tuned to the input frequency. This output energy will be amplified with respect to the input and may be extracted by a suitable output coupling 146.

Modulation of the input energy may be effected by a control grid 147 interposed between cathode 135 and accelerating grid 132, the modulating potentials being impressed between grid 147 and cathode 135 from a source 150 in any suitable manner, as shown. Modulating may also be effected by superposing the modulating signal upon reflector electrode 137. In this way the principle of transit-time modulation is applied to an amplifier device, which may be modulated if desired.

It will be understood that the reflector electrode of any of the above-described embodiments of the present invention may be used as the anode of an auxiliary electron discharge device, in the manner shown in Figs. 7 and 8.

It will also be understood that a control grid adjacent the cathode may be added in any of the above-described embodiments of the present invention. Such control grid may be used in a self-oscillating circuit in the manner shown in Fig. 11 for producing a fundamental frequency voltage to be supplied to the reflector electrode when serving as a frequency multiplier. Alternatively, such control grid may be used for modulation purposes, by coupling a source of modulating signal thereto in the manner shown in Fig. 15.

Furthermore, in any of the embodiments described, the average transit time in the reflector field may be selected or adjusted in the manner discussed above relative to Figs. 1 and 6, to produce a regenerative action in the reflector field, further reducing input requirements.

The devices of Fig. 7 or 8 may be used with circuits differing from those shown in the drawings. For example, instead of the oscillator circuits shown, the same auxiliary electron discharge device may form a conventional type amplifier, supplied with a fundamental frequency voltage impressed on its control or input electrode from any suitable fundamental frequency source. This forms a convenient and useful way of exciting the reflector electrode with a fundamental frequency signal.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. High frequency apparatus comprising means for producing an electron stream, a pair of electron-permeable electrodes along the path of said stream, a first cavity resonator including said electrodes as portions of the walls thereof, a reflector electrode in the path of said stream beyond said electrodes, a second cavity resonator coupled between said reflector electrode and one of said electron-permeable electrodes, said first cavity resonator being tuned to a frequency substantially harmonically related to the resonant frequency of said second cavity resonator, and means coupled to said second resonator for supplying energy to said second cavity resonator of a frequency substantially equal to said resonant frequency, whereby energy of a frequency harmonically related to said supplied energy frequency may be extracted from said first cavity resonator.

2. Ultra-high-frequency frequency-multiplying apparatus comprising means for producing an electron stream, a pair of electron-permeable electrodes disposed in the path of said stream and providing a narrow gap therebetween, a reflector electrode in the path of said stream beyond said electrodes, circuit means connected to said reflector electrode for applying an electron-retarding potential to said reflector electrode, whereby said electrons are returned through said gap, means coupled to said reflector electrode for superposing on said retarding potential a voltage of the fundamental frequency to be multiplied, and a tuned circuit coupled to said electrodes and tuned substantially to a harmonic of said fundamental frequency.

3. Ultra high frequency apparatus comprising means for producing an electron stream, a cavity resonator having a pair of electron-permeable walls along the path of said stream, a reflector electrode in said path beyond said electrodes, and circuit means connected to said reflector electrode for impressing a fundamental frequency to be multiplied on said reflector electrode, said resonator being tuned to a harmonic of said fundamental frequency, whereby energy of said harmonic frequency may be derived from said resonator.

4. High frequency apparatus comprising means including a cathode for producing an electron stream, an annular cavity resonator surrounding said cathode, a reflector electrode in the path of said stream for reflecting electrons from said cathode through said resonator, and means connected to said reflector electrode for varying the potential of said reflector electrode at a fundamental frequency, said cavity resonator being tuned to a harmonic of said fundamental frequency, whereby harmonic frequency energy is supplied to said cavity resonator by said stream for extracting therefrom.

5. Apparatus as in claim 4, wherein said potential-varying means comprises an oscillator circuit including said reflector electrode as a portion thereof.

6. High frequency apparatus comprising a cathode, a grid and a reflector electrode mounted in alignment, an oscillator circuit including said reflector electrode as an element thereof for producing variation of the potential of said reflector electrode at a fundamental frequency, circuit means coupled between said cathode and grid for projecting an electron stream toward said reflector electrode, and extracting means for extracting high frequency energy from said electron stream at a frequency harmonically related to said fundamental frequency, said extracting means being located in the path of said electron stream beyond the point of interaction of said stream with said reflector electrode.

7. Frequency-multiplying apparatus comprising means for producing an electron stream, means including a reflector electrode in the path of said stream for reversing the direction of the electrons of said stream, circuit means connected to said reflector electrode for varying the potential of said reflector electrode at a fundamental frequency to be multiplied, and means located in the path of said electron stream beyond the point of interaction of said stream with said reflector electrode for extracting high frequency energy from said reflected stream at a harmonic of said fundamental frequency.

8. Frequency-multiplying apparatus comprising means for producing an electron stream, means located in the path of said stream, for providing a retarding electric field along the path of said stream for retarding and reversing the electrons of said stream, circuit means coupled to said first recited means for varying said retarding field at a fundamental frequency to be multiplied, and means located in the path of said electron stream beyond the point of its reversal for extracting energy from said reversed electron stream at a harmonic of said fundamental frequency.

9. High frequency amplifier apparatus comprising cathode means for producing an electron stream, an accelerating electrode aligned with said cathode, said cathode means and said accelerating electrode adapted to produce a constant velocity electron stream, a reflector electrode in the path of said constant velocity stream, an input cavity resonator coupled between said reflector electrode and said accelerating electrode, circuit means connected to said reflector electrode for maintaining said reflector electrode at a negative potential with respect to said accelerating electrode, whereby the electrons of said stream are reversed in flight, circuit means coupled to said input cavity resonator for exciting said input resonator by a signal to be amplified, whereby the potential of said reflector electrode is periodically varied by said signal, and output cavity resonator means tuned substantially to the frequency of said signal and located in the path of said reversed electron stream, whereby an amplified version of said input signal may be derived from said output resonator.

10. High frequency apparatus comprising a cathode, an accelerating electrode aligned with said cathode, means coupled between said cathode and accelerating electrode for projecting a stream of electrons through said electrode, a reflector electrode in the path of said stream, circuit means coupled to said reflector electrode for varying the potential of said reflector electrode at a predetermined frequency, whereby said stream becomes transit-time modulated, and means located in the path of said stream for extracting high frequency energy from said modulated stream.

11. Apparatus as in claim 10, wherein said potential-varying means comprises a cavity resonator coupled between said accelerating electrode and said reflector electrode, and means coupled to said resonator for exciting said resonator at said predetermined frequency.

12. Apparatus as in claim 10, wherein said energy-extracting means comprises a cavity resonator having an electron-permeable wall in the path of electrons reflected by said reflector electrode.

13. Apparatus as in claim 10, further comprising circuit means coupled to said reflector electrode for adjusting the average reflector potential to a value producing a negative resistance, whereby said reflector potential-varying means requires less power.

ARTHUR E. HARRISON.

REFERENCES CITED

The following references are of record in the file of this patent:

UNITED STATES PATENTS

| Number | Name | Date |
|---|---|---|
| Re. 22,506 | Hahn | June 27, 1944 |
| 2,128,232 | Dallenbach | Aug. 30, 1938 |
| 2,128,236 | Dallenbach | Aug. 30, 1938 |
| 2,190,511 | Cage | Feb. 13, 1940 |
| 2,190,515 | Hahn | Feb. 13, 1940 |
| 2,220,556 | Thorson | Nov. 5, 1940 |
| 2,259,690 | Hansen | Oct. 21, 1941 |
| 2,402,983 | Brown | July 2, 1946 |
| 2,511,913 | Pierce et al. | Dec. 3, 1946 |
| 2,416,303 | Parker | Feb. 25, 1947 |